US009511689B2

(12) United States Patent
Mabashi et al.

(10) Patent No.: US 9,511,689 B2
(45) Date of Patent: Dec. 6, 2016

(54) SEATING APPARATUS FOR VEHICLE

(71) Applicants: MITSUBISHI JIDOSHA KOGYO KABUSHIKI KAISHA, Tokyo (JP); TACHI-S CO., LTD., Tokyo (JP)

(72) Inventors: Yohei Mabashi, Okazaki (JP); Yoshiyuki Shimomura, Okazaki (JP); Shigeya Fujino, Owariasahi (JP); Katsuhiko Sasaki, Anjyo (JP); Kazuya Imayou, Anjyo (JP); Toshiki Igarashi, Anjyo (JP); Masao Ishihara, Anjyo (JP)

(73) Assignees: Mitsubishi Jidosha Kogyo Kabushiki Kaisha, Tokyo (JP); Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 14/396,561

(22) PCT Filed: Mar. 26, 2013

(86) PCT No.: PCT/JP2013/058773
§ 371 (c)(1),
(2) Date: Oct. 23, 2014

(87) PCT Pub. No.: WO2013/161488
PCT Pub. Date: Oct. 31, 2013

(65) Prior Publication Data
US 2015/0115680 A1    Apr. 30, 2015

(30) Foreign Application Priority Data

Apr. 24, 2012    (JP) ................................. 2012-098657

(51) Int. Cl.
*B60N 2/30*    (2006.01)
*B60N 2/06*    (2006.01)
(Continued)

(52) U.S. Cl.
CPC ............... *B60N 2/3065* (2013.01); *B60N 2/06* (2013.01); *B60N 2/309* (2013.01); *B60N 2/3013* (2013.01);
(Continued)

(58) Field of Classification Search
CPC ... B60N 2/3065; B60N 2/3045; B60N 2/3058; B60N 2/309; B60N 2/43
See application file for complete search history.

(56) References Cited

U.S. PATENT DOCUMENTS 4,639,037 A * 1/1987 Maruyama ............... A47C 9/06
248/240.4
6,129,404 A * 10/2000 Mattarella ............ B60N 2/3013
296/64

(Continued)

FOREIGN PATENT DOCUMENTS

EP    1 164 050 A1    12/2001
EP    1 407 923 A1    4/2004
(Continued)

Primary Examiner — David R Dunn
Assistant Examiner — Tania Abraham
(74) Attorney, Agent, or Firm — Birch, Stewart, Kolasch & Birch, LLP

(57) ABSTRACT

A seating apparatus for a vehicle, in which a seat cushion supported on the vehicle body by a link member can be flipped up toward the front of the vehicle from a use position and which includes a locking mechanism that operates only when the seat cushion is acted upon by an inertial force greater than a predetermined force in the longitudinal direction of the vehicle, to temporarily prevent the seat cushion from flipping up. The locking mechanism includes a locking plate supported on the seat cushion and rockable in the longitudinal direction of the vehicle between a normal position and a rocked position, and a spring for urging the locking plate toward the normal position. The locking plate locks the seat cushion to the link member when it is moved (Continued)

inertially to the rocked position against the force of the spring, to prevent the seat cushion from flipping up, and the locking plate unlocks the seat cushion when it is located in the normal position.

1 Claim, 5 Drawing Sheets

(51) Int. Cl.
*B60N 2/42* (2006.01)
*B60N 2/68* (2006.01)
*B60N 2/70* (2006.01)

(52) U.S. Cl.
CPC . *B60N 2/43* (2013.01); *B60N 2/68* (2013.01); *B60N 2/70* (2013.01)

(56) References Cited

U.S. PATENT DOCUMENTS

| 6,293,603 | B1 * | 9/2001 | Waku | B60N 2/3011 296/65.05 |
| 6,371,559 | B1 * | 4/2002 | Kienzle | B60N 2/3013 296/65.09 |
| 6,959,960 | B2 * | 11/2005 | Buccinna | B60N 2/3013 296/190.11 |
| 7,246,857 | B2 * | 7/2007 | Kim | B60N 2/309 297/331 |
| 7,374,242 | B2 * | 5/2008 | Champ | B60N 2/3031 296/65.05 |
| 7,578,537 | B2 * | 8/2009 | Baetz | B60N 2/3013 296/65.05 |
| 2010/0213733 | A1 * | 8/2010 | Stark | B60N 2/3013 296/65.08 |
| 2012/0098311 | A1 * | 4/2012 | Kobayashi | B60N 2/3013 297/331 |

FOREIGN PATENT DOCUMENTS

| EP | 1810874 A2 | 7/2007 |
| JP | 09-142191 A | 6/1997 |
| JP | 2001-347863 A | 12/2001 |
| JP | 2002-362202 A | 12/2002 |
| JP | 2005-119500 A | 5/2005 |
| JP | 2005-343253 A | 12/2005 |

\* cited by examiner

SEATING APPARATUS FOR VEHICLE

TECHNICAL FIELD

The present invention relates to seating apparatus for vehicles, and more particularly, to a seating apparatus of which a seat cushion can be flipped up.

BACKGROUND ART

Seating apparatus applied, for example, to rear seating of vehicles and having a backrest that can be folded forward to expand a luggage space is widely known. Further, there has been known a technique of allowing the seat cushion (seat) to be flipped up toward the front of the vehicle before the backrest is folded forward, so that the backrest may be folded and stowed in the position where the seat cushion was situated before being flipped up and that the rear surface of the backrest, which serves as a floor surface of the luggage space, may be located as low as possible to expand the capacity of the luggage space.

In some seating apparatus of which the seat cushion can be flipped up, a locking mechanism is provided in order to prevent the seat cushion from flipping up (lifting up) unexpectedly when the vehicle is applied with an impact at the time of collision, for example.

As shown in Patent Document 1 by way of example, the locking mechanism includes a hooked locking member arranged below the seat cushion and urged by a spring or the like so that the locking member can be locked to the vehicle body. The locking mechanism is automatically locked when the seat cushion is brought to a normal seating position. When the seat cushion is to be flipped up, the locking mechanism is unlocked.

CITATION LIST

Patent Literature

Patent Document 1: Japanese Unexamined Patent Publication No. H09-142191

SUMMARY OF INVENTION

Technical Problem

Where a seating apparatus is equipped with the locking mechanism disclosed in Patent Document 1, however, the locking mechanism needs to be manually unlocked each time the seat cushion is flipped up. In the case of Patent Document 1, for example, to unlock the locking mechanism, the user has to insert his/her finger into a narrow gap between the backrest and the seat cushion and manipulate the locking member located below the seat cushion, giving rise to a problem that the unlocking operation is difficult to perform.

The present invention was made to solve the above problem, and an object thereof is to provide a seating apparatus for a vehicle whereby a seat cushion can be prevented from lifting up at the time of collision of the vehicle and also can be flipped up easily when a backrest is to be stowed.

Solution to Problem

To achieve the above object, the first aspect of the invention provides a seating apparatus for a vehicle, in which a seat cushion is flipped up toward a front of the vehicle from a use position allowing a passenger to sit on the seat cushion, wherein a locking device is associated with the seat cushion and operates only when the seat cushion is acted upon by an inertial force greater than a predetermined force in a longitudinal direction of the vehicle, to temporarily prevent the seat cushion from flipping up.

According to the second aspect of the invention., the locking device includes a rocking member supported on the seat cushion and rockable in the longitudinal direction of the vehicle between a normal position and a rocked position, and an urging member which urges the rocking member toward the normal position, and the rocking member locks the seat cushion to a vehicle body-side member when the rocking member is moved inertially to the rocked position against force of the urging member, to prevent the seat cushion from flipping up, and unlocks the seat cushion when the rocking member is in the normal position.

According to the third aspect of the invention, the vehicle body-side member includes a link member extending in the longitudinal direction of the vehicle, the link member has a front end coupled to the vehicle body so as to be pivotable in the longitudinal direction and a rear end coupled to the seat cushion so as to be pivotable in the longitudinal direction, forward rocking motion of the seat cushion from the use position about the front end of the link member is restricted by a restricting device, the seat cushion is rocked forward by raising a front of the seat cushion from the use position about the rear end of the link member and then rocking the seat cushion forward about the front end of the link member, and the locking device restricts upward movement of the front of the seat cushion by locking the rocking member to the link member, to prevent the seat cushion from flipping up.

According to the fourth aspect of the invention, the seat cushion includes an engaging device capable of elastically engaging with and disengaging from the link member in the use position, and the engaging device is disengaged from the link member by moving the front of the seat cushion upward.

Advantageous Effects of Invention

According to the first aspect of the invention, the locking device temporarily prevents the seat cushion from flipping up only when the seat cushion is acted upon by an inertial force greater than the predetermined force in the longitudinal direction of the vehicle, whereby the seat cushion can be reliably prevented from lifting up (flipping up unexpectedly) at the time of collision or the like of the vehicle. Further, while the seat cushion is not acted upon by inertial force as in the case where the vehicle is standing, the seat cushion can be easily flipped up without the need to unlock the locking device.

According to the second aspect of the invention, the rocking member locks the seat cushion to the vehicle body-side member when the rocking member is moved inertially to the rocked position against the force of the urging member of the locking device. Thus, when the rocking member is moved inertially to the rocked position at the time of collision or the like of the vehicle, for example, the seat cushion is locked to the vehicle body and is prevented from flipping up. On the other hand, while the rocking member is not inertially moved and remains in the normal position, the seat cushion is unlocked and thus can be flipped up.

In this manner, flipping up of the seat cushion is automatically restricted and enabled as the rocking member of the locking device moves inertially. Thus, despite its simple structure, the locking device is able to prevent the seat cushion from lifting up (flipping up unexpectedly) when the seat cushion is acted upon by an inertial force (acceleration) greater than the predetermined force in the backward direction of the vehicle as in the case where the vehicle is hit from behind, and also permits the seat cushion to be flipped up easily without the need to unlock the locking device while the vehicle is stopped.

According to the third aspect of the invention, when the seat cushion is in the normal use position, forward rocking motion of the seat cushion about the front end of the link member is restricted by the restricting device, and when the seat cushion is acted upon by inertial force, the locking device locks the link member so as to restrict rocking motion of the seat cushion about the rear end of the link member.

Thus, in the seating apparatus configured such that the seat cushion is supported on the vehicle body by the link member extending in the longitudinal direction of the vehicle, when the seat cushion is acted upon by inertial force in the forward direction of the vehicle as in the case of frontal collision, forward rocking motion of the seat cushion is restricted by the restricting device, and when the seat cushion is acted upon by inertial force in the backward direction of the vehicle as in the case of rear-end collision, the seat cushion is locked to the link member by the locking device to restrict upward movement of the seat cushion, whereby flipping up of the seat cushion at the time of collision of the vehicle can be prevented more reliably.

According to the fourth aspect of the invention, the seat cushion is provided with the engaging device which is capable of elastically engaging with and disengaging from the link member when the seat cushion is in the use position, and thus, the seat cushion can be reliably held in the use position. Further, the engaging device can be easily disengaged from the link member when the seat cushion is flipped up following a sequence of steps.

DESCRIPTION OF EMBODIMENTS

An embodiment of the present invention will be described below with reference to the drawings.

Figure 1:
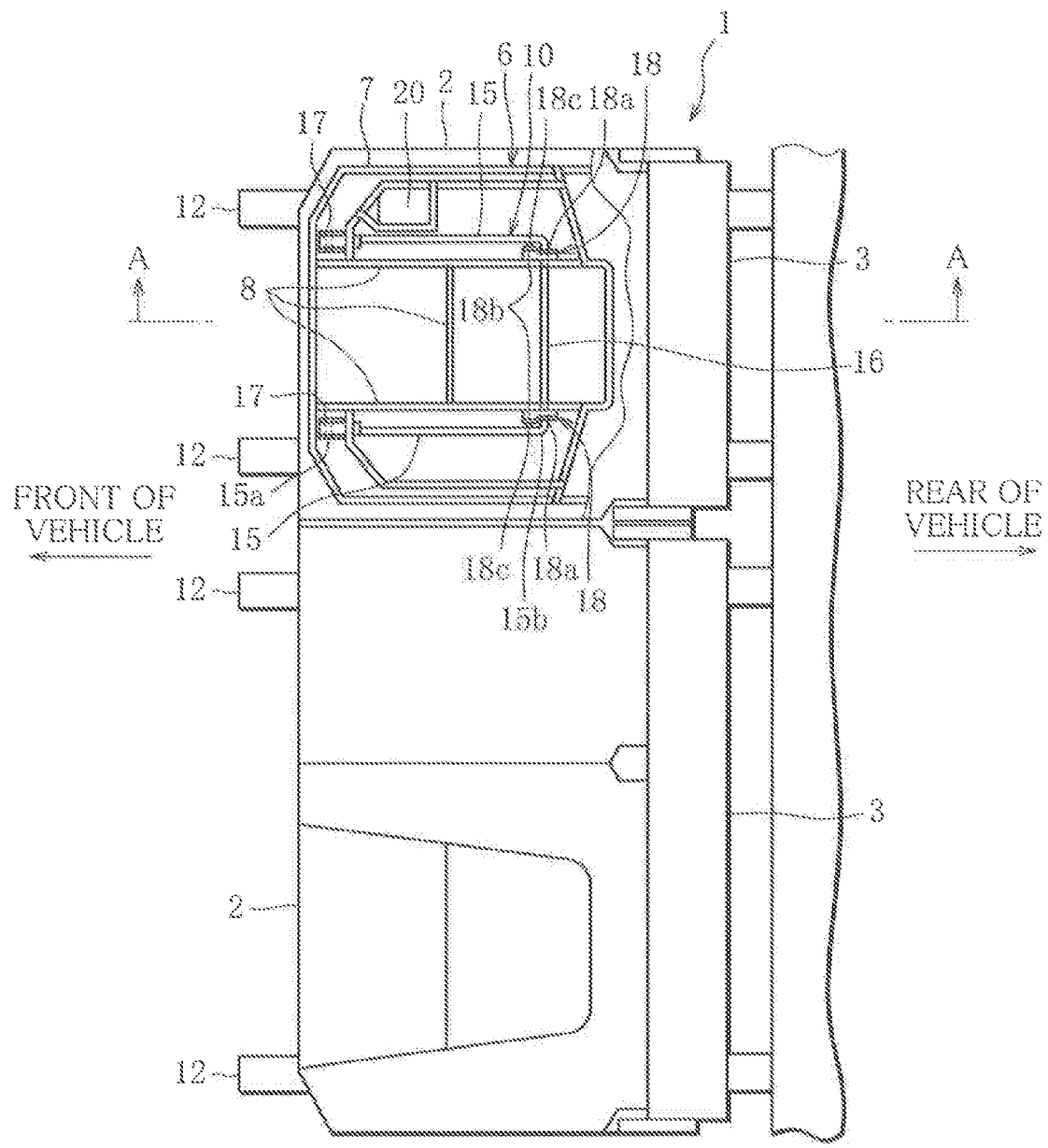
FIG. 1 is a plan view illustrating the structure of an automobile seating apparatus according to one embodiment of the present invention.
Figure 2:
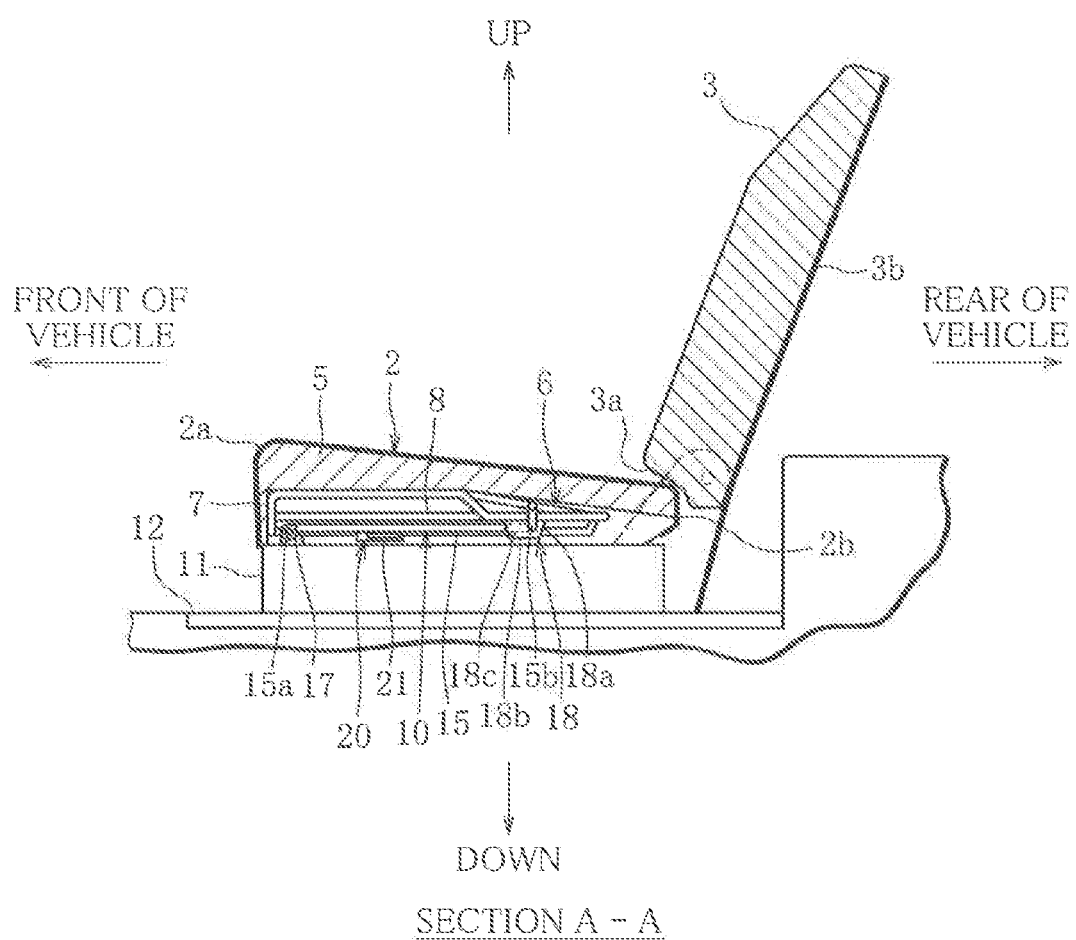
FIG. 2 is a vertical sectional view illustrating the structure of the seating apparatus.

FIG. 1 is a plan view illustrating the structure of an automobile seating apparatus 1 according to one embodiment of the present invention. FIG. 2 is a vertical sectional view illustrating the structure of the automobile seating apparatus 1 according to the embodiment of the present invention.

The seating apparatus 1 of the embodiment is applied to a second or subsequent row of seating in a vehicle.

As illustrated in FIGS. 1 and 2, the seating apparatus 1 comprises a seat cushion 2 as a seat on which a passenger sits, and a backrest 3.

The seat cushion 2 includes a cushion pad 5 serving as a passenger's seat and made of urethane or the like, and a frame 6 supporting the cushion pad 5 from below.

The frame 6 is slender piping and comprises an outer peripheral member 7 bent into a generally rectangular shape so as to support an outer peripheral portion of the cushion pad 5, and a plurality of connecting members 8 connecting opposite front and rear sides and opposite right and left sides of the outer peripheral member 7. The connecting members 8 support a central portion of the cushion pad 5 and have the function of restraining excessive sinking of the cushion pad 5. The frame 6 is fitted and fixed in a lower portion of the cushion pad 5.

A bottom cover 11 is disposed under the seat cushion 2.

The bottom cover 11 has the function of covering the lower portion of the seat cushion 2 in a use position (position allowing a passenger to sit). Also, the bottom cover 11 is movable back and forth in a longitudinal direction of the vehicle along slide rails 12 supported on the vehicle body and functions as a pedestal for supporting the seat cushion 2.

The bottom cover 11 has a link member 10, and the frame 6 of the seat cushion 2 is supported on the bottom cover 11 by the link member 10 so as to be rockable (pivotable) back and forth.

The link member 10 is formed by bending a pipe into a generally U shape and is arranged between the cushion pad 5 and the bottom cover 11 with an opening thereof directed forward. The link member 10 has two main portions 15 located right and left with a space therebetween and extending in the longitudinal direction of the vehicle, and a connecting portion 16 connecting rear ends 15b of the two main portions 15 to each other and extending in a width direction of the vehicle.

The two main portions 15 of the link member 10 are coupled at respective front ends 15a to a front portion of the bottom cover 11 by hinges 17 so that the link member 10 may be pivotable back and forth (up and down).

The connecting portion 16 of the link member 10 is coupled to a longitudinally intermediate portion of the frame 6 under the seat cushion 2 so that the link member 10 may be pivotable back and forth (up and down).

When the seat cushion 2 is in the use position (state allowing a passenger to sit) as illustrated in FIG. 2, the link member 10 is in a folded state with respect to the frame 6, lying in the longitudinal direction of the vehicle. In the folded state, the link member 10 and the frame 6 elastically engage with each other. That is, when the seat cushion 2 is in the use position (position allowing a passenger to sit), the seat cushion 2 (frame 6) is held in place so as not to rock (pivot) relative to the link member 10. Also, the seat cushion 2 has a vertical dimension, or thickness, gradually decreasing from the front portion toward the rear end portion and is arranged such that the rear end portion is inserted under a lower end 3a of the backrest 3. Thus, upward movement of the rear end 2b of the seat cushion 2 is restricted when the seat cushion 2 is in use.

The configuration of the link member 10 and the frame 6 will be described in detail with reference to FIGS. 1, 2 and 4.

Brackets 18 are fixed to the respective connecting members 8 of the frame 6 and have holes 18a through which the connecting portion 16 of the link member 10 is pivotably inserted. Further, each bracket 18 has a portion 18b extending along the corresponding main portion 15 of the link member 10 and a semispherical protuberance 18c (engaging device) protruding from the portion 18b toward the main portion 15. When the seat cushion 2 is in the use position (position allowing a passenger to sit), the protuberances 18c are located below and close to the respective main portions 15 of the link member 10 and engaged with the main portions 15. When the main portions 15 of the link member 10 are moved upward beyond the protuberances 18c, the frame 6 can be pivoted (rocked) upward from the seating position about the connecting portion 16 of the link member 10 as an axis. Namely, the seat cushion 2 and the link member 10 can be elastically engaged with and disengaged from each other by means of the link member 10 and the brackets 18 of the frame 6. The engagement of the seat cushion 2 (frame 6) and the link member 10 is set so as to be easily released when applied with a suitable force by a passenger or the like.

Thus, when the seat cushion 2 is in use, the seat cushion 2 (frame 6) and the link member 10 are engaged with each other with an appropriate elastic force, and when the front end 2a of the seat cushion 2 is moved upward by a passenger or the like, the engagement is released.

Figure 3:
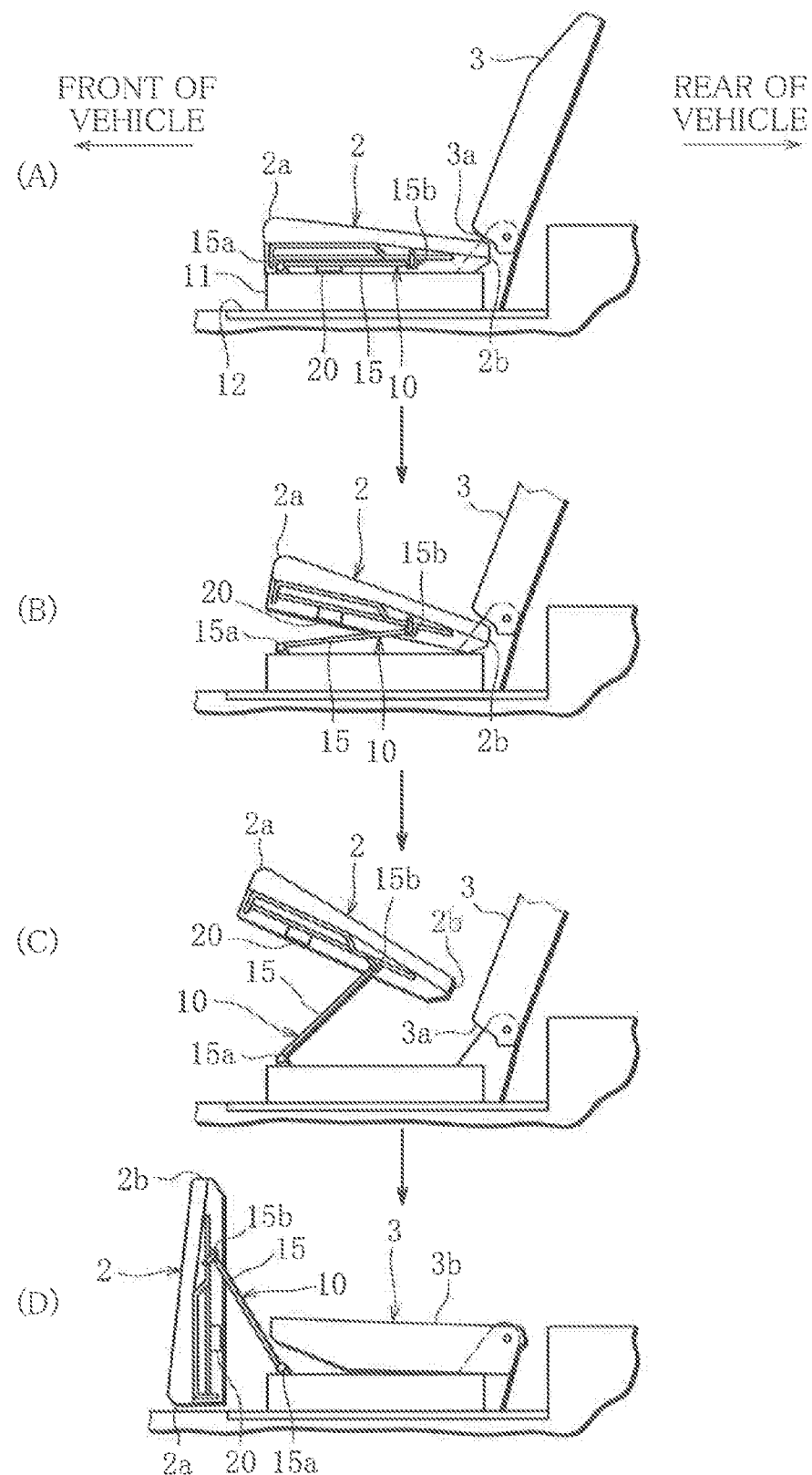
FIG. 3 illustrates the manner of how a backrest of the seating apparatus of the embodiment is stowed.

The seating apparatus 1 configured as described above permits the seat cushion 2 to flip up toward the front of the vehicle and also permits the backrest 3 to fold forward into a stowed position, as illustrated in FIG. 3.

FIG. 3 illustrates the manner of how the backrest 3 of the seating apparatus 1 of the embodiment is stowed. FIG. 3(A) shows the seat cushion 2 in the use position allowing a passenger to sit, and FIG. 3(D) shows the backrest 3 in the stowed position with the seat cushion 2 flipped up. The seat cushion 2 and the backrest 3 are moved in the manner shown in (A), (B), (C) and (D) in order.

Referring to FIG. 3, the manner of how the seating apparatus 1 of the embodiment is moved will be explained in detail.

When the seating apparatus 1 is used normally as a seat, the seat cushion 2 is set in the use position to permit a passenger to sit thereon (FIG. 3(A)). To stow the backrest 3, first, the front end 2a of the seat cushion 2 is raised from the use position, to disengage the seat cushion 2 (frame 6) from the link member 10. Since the engagement is released, the seat cushion 2 is rockable about the rear ends 15b of the link member 10. Thus, the front end 2a of the seat cushion 2 is further raised using the rear end 2b of the seat cushion 2 as a fulcrum (FIG. 3(B)). At this time, the rear ends 15b of the link member 10 are rocked upward about the front ends 15a, together with the seat cushion 2, making the seat cushion 2 rockable (movable) forward. The seat cushion 2 is then pulled forward, whereupon the seat cushion 2 rocks (moves) forward about the front ends 15a of the link member 10 (FIG. 3(C)). By this time, the rear end 2b of the seat cushion 2 is completely removed from under the lower end 3a of the backrest 3. Then, the seat cushion 2 is further rocked forward such that the seat cushion 2 assumes a substantially upright position with its front and rear ends 2a and 2b directed downward and upward, respectively. In this manner, the seat cushion 2 is rocked forward into a flipped-up position. The backrest 3 is then folded forward into the stowed position (FIG. 3(D)).

Thus, the seating apparatus 1 is configured such that the seat cushion 2 is movable between the use position allowing a passenger to sit thereon and the flipped-up forward position. With the seat cushion 2 flipped up, the backrest 3 is folded down onto the area previously occupied by the seat cushion 2, whereby the backrest 3 can be folded forward over a great tilt angle and the rear surface 3b of the backrest 3 can be located as low as possible, making it possible to expand the luggage space. When the backrest 3 is in the stowed position, the rear surface 3b of the backrest 3 forms part of the floor surface of the luggage space.

Figure 4:
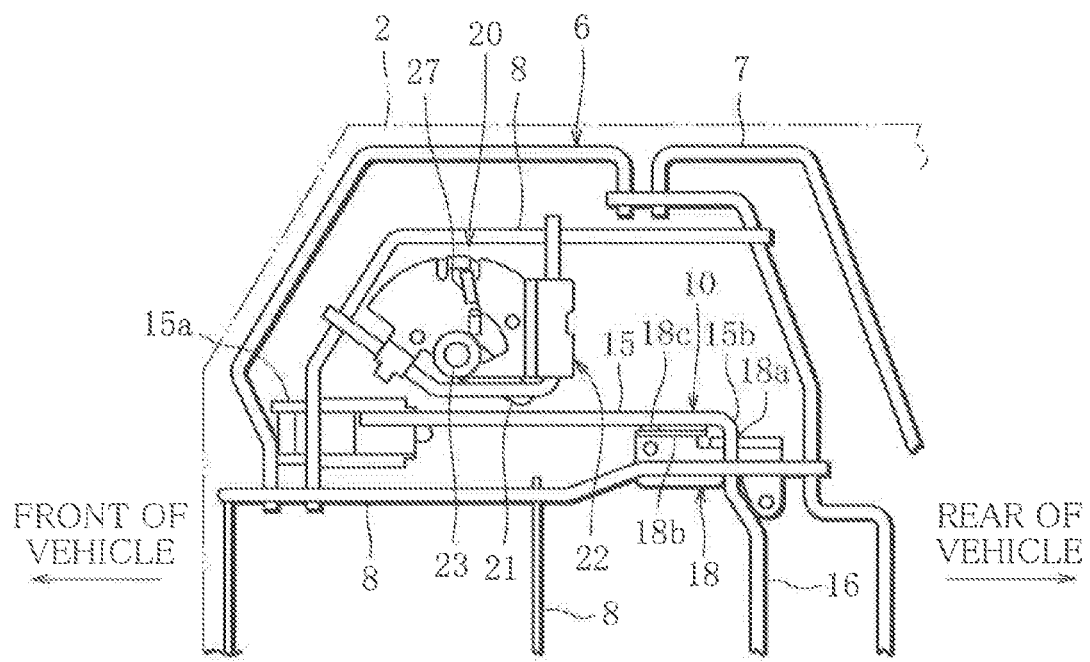
FIG. 4 is a plan view illustrating the structure of a locking mechanism.

As illustrated in FIG. 4, the seating apparatus 1 of the embodiment is further equipped with a locking mechanism 20 (locking device) which temporarily locks the seat cushion 2 to the link member 10 to prevent flipping up (unintended flipping up) of the seat cushion 2. The locking mechanism 20 is configured such that the seat cushion 2 is locked only when an inertial force greater than a predetermined force acts upon the locking mechanism 20 toward the rear of the vehicle, as in the case of collision of the vehicle, to prevent the seat cushion 2 from flipping up.

Figure 5:
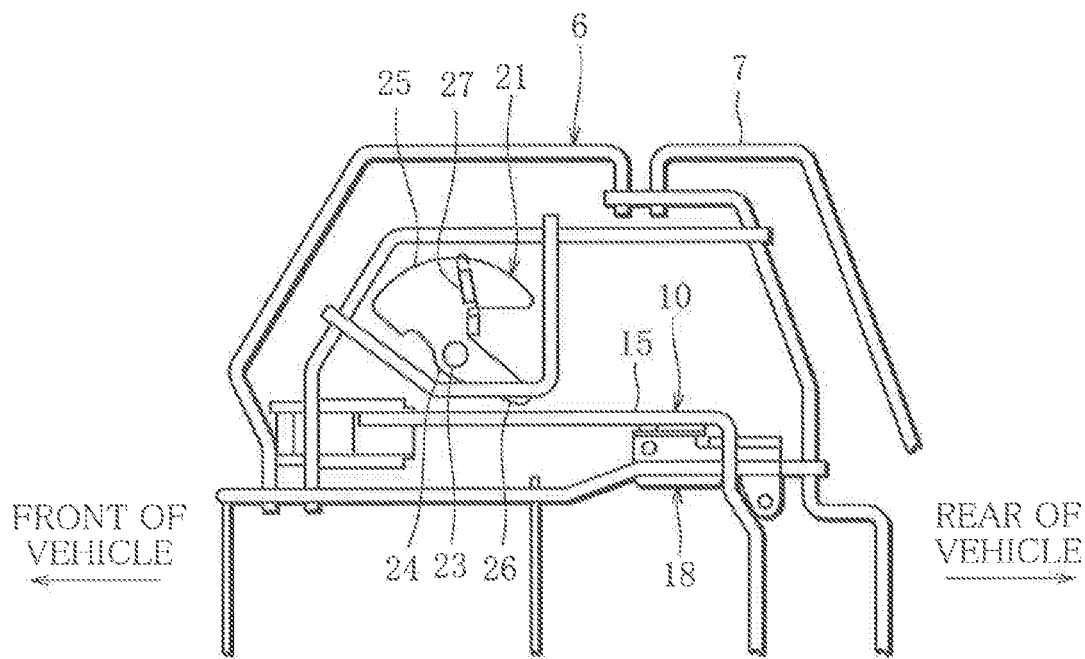
FIG. 5 is a plan view illustrating the shape of a locking plate.
Figure 6:
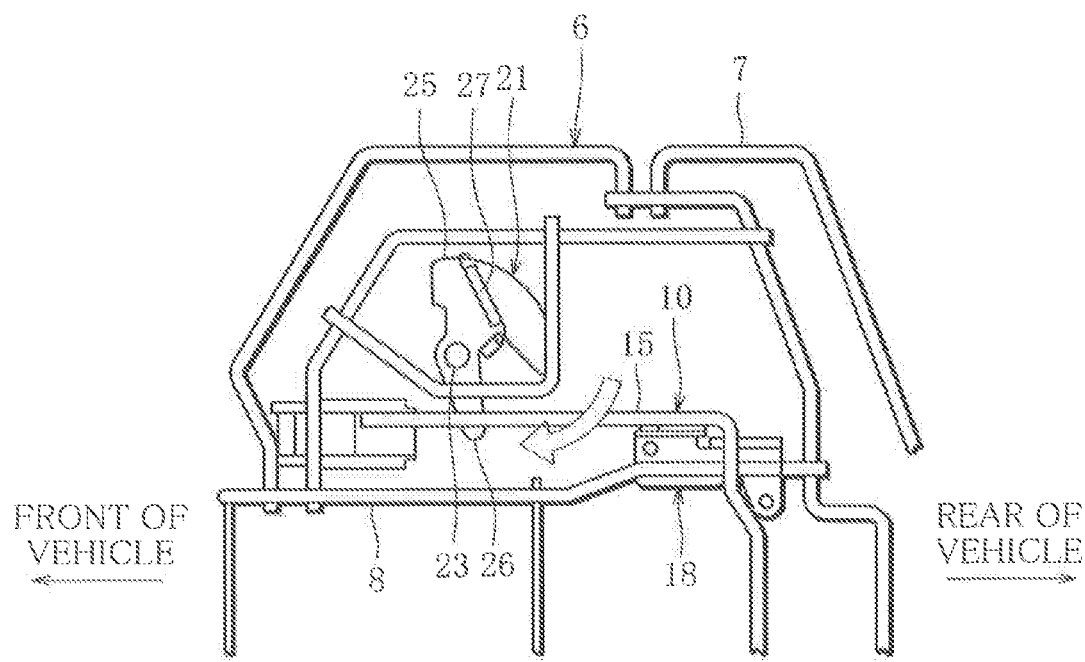
FIG. 6 is a plan view illustrating the state of the locking plate in a rocked position.

Referring now to FIGS. 4, 5 and 6, the structure of the locking mechanism 20 will be described in detail.

FIG. 4 is a plan view illustrating the structure of the locking mechanism 20. FIG. 5 is a plan view illustrating the shape of a locking plate 21. Also, FIG. 5 shows the locking plate 21 in a normal position. FIG. 6 is a plan view illustrating the locking plate 21 in a rocked position.

The locking mechanism 20 comprises a base bracket 22 fixed to the frame 6, the locking plate 21, and a spring 27.

The base bracket 22 is located adjacent to and on the outer side of one of the two main portions 15 of the link member 10 with respect to the width direction.

The base bracket 22 has a vertically extending shaft 23, and the locking plate 21 is rockably supported on the shaft 23.

The locking plate 21 is made of steel, for example, and as shown in FIG. 5, has a boss 24 through which the shaft 23 penetrates, a fan-shaped weight 25 protruding radially outward from the boss 24, and a pawl 26 protruding from the boss 24 in a direction nearly opposite to that in which the weight 25 protrudes. The weight 25 has a large plate thickness so that the weight thereof may be greater than the weight of the pawl 26.

Also, the locking plate 21 and the base bracket 22 are connected to each other by the spring 27 having a relatively small spring constant, and the spring 27 exerts force such that the locking plate 21 is located in an almost fixed position (normal position) with respect to the base bracket 22.

Because of the force exerted by the spring 27, the locking plate 21 is normally oriented in such a manner that the weight 25 and the pawl 26 are located outside and inside (toward the nearby main portion 15 of the link member 10), respectively, with respect to the width direction. In this state, the pawl 26 extends obliquely rearward (e.g. at an angle of 60 degrees) so that the distal end of the pawl 26 may not overlap with the link member 10 when viewed from above (FIG. 5).

Also, the locking plate 21 is configured such that when the locking plate 21 is acted upon by an inertial force greater than the predetermined force in the backward direction of the vehicle, the weight 25 rocks about the shaft 23 toward the rear of the vehicle against the force of the spring 27, as shown in FIG. 6. The supporting position of the locking plate 21 and the length of the pawl 26 are set such that when the pawl 26 is rocked forward by tens of degrees, for example, with backward movement of the weight 25, the distal end of the pawl 26 overlaps with the link member 10 as viewed from above (FIG. 6). Also, in this case, the pawl 26 is located below and vertically close to the main portion 15 of the link member 10 while the seat cushion 2 is in the use position. Thus, the locking mechanism 20 normally assumes a position (unlocking position) in which the pawl 26 of the locking plate 21 does not overlap with the main portion 15 of the link member 10, and when the locking mechanism 20 is acted upon by inertial force in the backward direction of the vehicle, the pawl 26 of the locking plate 21 is rocked (moved) to a position (locking position) underlying the main portion 15 of the link member 10, to lock the link member 10 to the locking plate 21.

The seating apparatus 1 of the embodiment is configured such that the locking mechanism 20 operates only when the vehicle is hit from behind (when inertial force acts upon the seating apparatus 1 in the backward direction of the vehicle), to temporarily prevent the seat cushion 2 from flipping up.

In the following, movement of the seat cushion 2 and operation of the locking mechanism 20 at the time of vehicle collision will be explained in detail.

First, let it be assumed that the vehicle is hit from behind.

When the vehicle is hit from behind, the seat cushion 2 tends to move backward relative to the vehicle body due to inertial force. However, since the seat cushion 2 is coupled to the bottom cover 11 by the link member 10 and also since movement of the rear end 2b of the seat cushion 2 is restricted by the backrest 3, the seat cushion 2 tends to turn upward about its rear end 2b as a fulcrum. If the locking mechanism 20 is not equipped, the protuberances 18c of the brackets 18 of the frame 6 may possibly move upward beyond the respective main portions 15 of the link member 10, releasing the engagement between the frame 6 and the link member 10. As a result, the front end portion 2a of the seat cushion 2 possibly moves upward, leaving the seat cushion 2 in an uplifted state (unintended flipped-up state).

With the locking mechanism 20 of the embodiment, by contrast, even if the front end portion 2a of the seat cushion 2 tends to move upward due to inertial force, the locking mechanism 20 locks the seat cushion 2 to the link member 10 and restricts movement of the seat cushion 2, whereby the seat cushion 2 can be prevented from lifting up.

Operation of the locking mechanism 20 will now be described in detail.

When the locking mechanism 20 is acted upon by backward inertial force due to rear-end collision of the vehicle, the locking plate 21 of the locking mechanism 20 tends to move backward relative to the vehicle body due to the inertial force. The locking plate 21 is configured such that the weight 25 located on the outer side of the shaft 23 is heavier than the pawl 26 located on the inner side of the shaft 23. Accordingly, when the locking plate 21 is acted upon by backward inertial force, the weight 25 located on the outer side of the shaft 23 rocks backward against the force of the spring 27, because the inertial force acting on the outer side of the shaft 23 is greater than that acting on the inner side of the shaft 23, so that the pawl 26 located on the inner side of the shaft 23 rocks forward.

As a result, the pawl 26 moves to a position under the main portion 15 of the link member 10, as shown in FIG. 6. Since the pawl 26 is located under and close to the main portion 15 of the link member 10, movement of the frame 6 relative to the main portion 15 of the link member 10, that is, upward movement of the seat cushion 2 is restricted.

Thus, while the upward movement of the frame 6 relative to the main portion 15 of the link member 10 is restricted, the front end portion 2a of the seat cushion 2 cannot be raised. Consequently, at the time of rear-end collision of the vehicle, the upward movement of the front end portion 2a of the seat cushion 2 is restricted by the locking mechanism 20 of the seat cushion 2, whereby the seat cushion 2 is prevented from lifting up.

While the vehicle is stopped, the locking mechanism 20 is not actuated. Specifically, the locking plate 21 is not inertially moved and remains in the normal position, and since the pawl 26 does not overlap with the link member 10 as viewed from above, the front end portion 2a of the seat cushion 2 is allowed to move upward relative to the main portions 15 of the link member 10. Consequently, the seat cushion 2 can be flipped up by raising the front end portion 2a of the seat cushion 2 to disengage the frame 6 from the link member 10 and then pulling the whole seat cushion 2 forward.

Let it now be assumed that the vehicle collides head-on.

With the seating apparatus 1 of the embodiment, the locking mechanism 20 is not actuated at the time of frontal collision. When the vehicle collides head-on, the rear end portion 2b of the seat cushion 2 tends to rock upward about the front ends 15a of the link member 10 due to inertial force, but since the lower part of the front end of the seat cushion 2 interferes with the upper part of the front end of the bottom cover 11 (restricting device), such rocking motion of the seat cushion 2 is prevented. Also, since the rear end 2b of the seat cushion 2 is inserted under the lower end 3a of the backrest 3, upward movement of the rear end 2b of the seat cushion 2 is restricted also by the backrest 3 (restricting device). At the time of frontal collision, the front end portion 2a of the seat cushion 2 is pushed downward, and therefore, the seat cushion 2 (frame 6) is not disengaged from the link member 10.

As stated above, according to the embodiment, when the seat cushion 2 (locking mechanism 20) is acted upon by inertial force in the backward direction of the vehicle, as in the case of rear-end collision of the vehicle, uplift of the seat cushion 2 can be prevented by the action of the locking mechanism 20. While the vehicle is stopped, on the other hand, the locking mechanism 20 remains in the unlocking position, and therefore, the front end portion 2a of the seat cushion 2 can be raised without the need to perform any special manipulation, so that the seat cushion 2 can be flipped up easily.

The present invention is not limited to the foregoing embodiment. For example, in the above embodiment, the seat cushion 2 is locked to the link member 10 by the pawl 26 of the locking plate 21, but it may alternatively be locked to a vehicle body-side structure, such as the bottom cover 11, by the pawl 26. Also, the configuration of the locking mechanism 20 is not limited to the one described above with reference to the embodiment and may be of any configuration insofar as the locking mechanism 20 is capable of inertial movement to lock and unlock the seat cushion.

Further, the present invention is applicable not only to a rearmost-row seat of a vehicle but to a second-row seat of a vehicle having three rows of seats, and also can be applied to a wide range of seating apparatus configured to stow the backrest with the seat cushion flipped up.

REFERENCE SIGNS LIST

1: seating apparatus
2: seat cushion
3: backrest (restricting device)
10: link member
11: bottom cover (restricting device)
20: locking mechanism
21: locking plate
27: spring

The invention claimed is:
1. A seating apparatus for a vehicle, in which a seat cushion is flipped up toward a front of the vehicle from a use position allowing a passenger to sit on the seat cushion, the seating apparatus comprising:
- a link member which is pivotable in a manner such that the seat cushion is flipped up from the use position toward the front of the vehicle; and
- a locking device associated with the seat cushion and capable of restricting pivotal movement of the link member, wherein the locking device includes
- a rocking member supported on the seat cushion and rockable between a normal position permitting the pivotal movement of the link member and a rocked position restricting the pivotal movement of the link member, and
- an urging member which urges the rocking member toward the normal position, wherein the rocking member includes
- a weight which, in response to backward inertial force acting upon the seat cushion, rocks from the normal position to the rocked position due to the inertial force, against force of the urging member, and
- a pawl which rocks from the normal position to the rocked position along with the weight and engages with the link member to restrict the pivotal movement of the link member, wherein the link member extends in a longitudinal direction of the vehicle and has a front end coupled to the vehicle body so as to be pivotable in the longitudinal direction and a rear end coupled to the seat cushion so as to be pivotable in the longitudinal direction, wherein forward rocking motion of the seat cushion from the use position about the front end of the link member is restricted by a restricting device, and the seat cushion is rocked forward by raising a front of the seat cushion from the use position about the rear end of the link member and then rocking the seat cushion forward about the front end of the link member, and wherein the seat cushion includes an engaging device capable of elastically engaging with and disengaging from the link member in the use position, and the engaging device is disengaged from the link member by moving the front of the seat cushion upward.

* * * * *